United States Patent
Kobayashi et al.

(10) Patent No.: US 12,168,477 B2
(45) Date of Patent: Dec. 17, 2024

(54) METHOD FOR MANUFACTURING PRESS-FORMED PRODUCT, PRESS FORMING DIE, AND PRESS-FORMED PRODUCT

(71) Applicant: SUBARU CORPORATION, Tokyo (JP)

(72) Inventors: Takufumi Kobayashi, Hyogo (JP); Yujiro Mitsui, Tokyo (JP); Yu Fukazawa, Tokyo (JP); Shosuke Sakata, Tokyo (JP); Toshiyuki Kumazawa, Tokyo (JP); Ryusuke Iwata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 305 days.

(21) Appl. No.: 17/718,885

(22) Filed: Apr. 12, 2022

(65) Prior Publication Data
US 2022/0332373 A1 Oct. 20, 2022

(30) Foreign Application Priority Data
Apr. 14, 2021 (JP) .................. 2021-068524

(51) Int. Cl.
*B62D 25/12* (2006.01)
*B21D 22/06* (2006.01)
(Continued)

(52) U.S. Cl.
CPC ............. *B62D 25/12* (2013.01); *B21D 22/06* (2013.01); *B21D 37/08* (2013.01); *B21D 53/88* (2013.01); *B60J 5/0415* (2013.01)

(58) Field of Classification Search
CPC ......... B21D 37/08; B21D 22/26; B21D 22/20
See application file for complete search history.

(56) References Cited

U.S. PATENT DOCUMENTS

| 2006/0090530 A1 | 5/2006 | Hammer et al. | |
| 2020/0338618 A1* | 10/2020 | Akiba | B21D 22/26 |
| 2022/0152682 A1* | 5/2022 | Akiba | B21D 37/08 |

FOREIGN PATENT DOCUMENTS

| JP | 2007-512960 A | | 5/2007 |
| JP | 2017030038 A | * | 2/2017 |

(Continued)

OTHER PUBLICATIONS

JP-2017030038-A Translation (Year: 2017).*
Office Action dated Jul. 16, 2024, from corresponding Japan Patent Application No. 2021-068524, 6 pages.

*Primary Examiner* — Michael W Hotchkiss
(74) *Attorney, Agent, or Firm* — Rimon P.C.

(57) ABSTRACT

A press-formed product is manufactured by press-forming a blank material into an intermediate shape, and further press-forming the blank material from the intermediate shape into the press-formed product having a target shape. A product portion of the target shape includes a first ridge line portion and a second ridge line portion each having a radius of curvature of 20 mm or smaller and a bending angle of 130 degrees or larger. The product portion of the intermediate shape has a curved shape having a radius of curvature of 100 mm or larger or a linear shape in a specific cross section. A height of an excess thickness portion of the intermediate shape is higher than 10 mm with respect to a peripheral portion and lower than a height of the excess thickness portion of the target shape.

7 Claims, 14 Drawing Sheets

(51) Int. Cl.
*B21D 37/08* (2006.01)
*B21D 53/88* (2006.01)
*B60J 5/04* (2006.01)

(56) References Cited

FOREIGN PATENT DOCUMENTS

| | | |
|---|---|---|
| JP | 2018-183786 A | 11/2018 |
| JP | 2019-018225 A | 2/2019 |
| WO | 2019/102972 A1 | 5/2019 |
| WO | 2020-195591 A1 | 10/2020 |

* cited by examiner

METHOD FOR MANUFACTURING PRESS-FORMED PRODUCT, PRESS FORMING DIE, AND PRESS-FORMED PRODUCT

CROSS-REFERENCE TO RELATED APPLICATIONS

The present application claims priority from Japanese Patent Application No. 2021-068524 filed on Apr. 14, 2021, the entire contents of which are hereby incorporated by reference.

BACKGROUND

1. Technical Field

The present disclosure relates to a method for manufacturing a press-formed product, a press forming die, and a press-formed product.

2. Related Art

A ridge line portion called a character line may be provided in a press-formed product forming a design surface such as an outer panel of an automobile. Since the character line greatly contributes to an aesthetic appearance, it is intended to clearly form the character line.

Japanese Unexamined Patent Application Publication (JP-A) No. 2017-030038, JP-A No. 2019-018225, and WO 2019-102972 disclose methods for manufacturing press-formed products used in automobiles or the like. In these methods, press forming is divided into two steps to prevent forming defects, and character lines are clearly formed by variously adjusting forming parameters.

SUMMARY

According to a first aspect of the present disclosure, there is provided a method for manufacturing a press-formed product for press-forming a blank material into a target shape. The blank material includes a product portion constituting a design surface of a product, a peripheral portion pressed by a blank holder, and an excess thickness portion connecting the product portion and the peripheral portion. The method includes press-forming the blank material into an intermediate shape, and further press-forming the blank material from the intermediate shape into the press-formed product having a target shape. The product portion of the target shape includes a first ridge line portion and a second ridge line portion on the design surface. The first ridge line portion and the second ridge line portion each has a radius of curvature of 20 mm or smaller and a bending angle of 130 degrees or larger. The product portion of the target shape includes a first region from one end of the product portion to the first ridge line portion, a second region from the first ridge line portion to the second ridge line portion, and a third region from the second ridge line portion to the other end of the product portion in a specific cross section perpendicular to a direction in which the first ridge line portion or the second ridge line portion extends. The product portion of the intermediate shape has a shape the same as the target shape in a central region corresponding to the second region of the target shape. The product portion of the intermediate shape has a curved shape having a radius of curvature of 100 mm or larger or a linear shape from the central region toward the excess thickness portions on both sides in the specific cross section. A height of the excess thickness portion of the intermediate shape is higher than 10 mm with respect to the peripheral portion and lower than a height of the excess thickness portion of the target shape.

According to a second aspect of the present disclosure, there is provided a press forming die used for press-forming the intermediate shape in the method for manufacturing the press-formed product. The press forming die includes a pair of forming surfaces corresponding to the intermediate shape.

According to a third aspect of the present disclosure, there is provided a press-formed product constituting a design surface of a hood panel or a door panel of a vehicle. The hood panel or the door panel includes a first ridge line portion and a second ridge line portion each having a radius of curvature of 20 mm or smaller and a bending angle of 130 degrees or larger. The first ridge line portion and the second ridge line portion extend from a front side to a rear side of the vehicle when the hood panel or the door panel is attached to the vehicle. The first ridge line portion and the second ridge line portion are provided so as to be adjacent to each other on the same design surface.

BRIEF DESCRIPTION OF DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Figure 1:
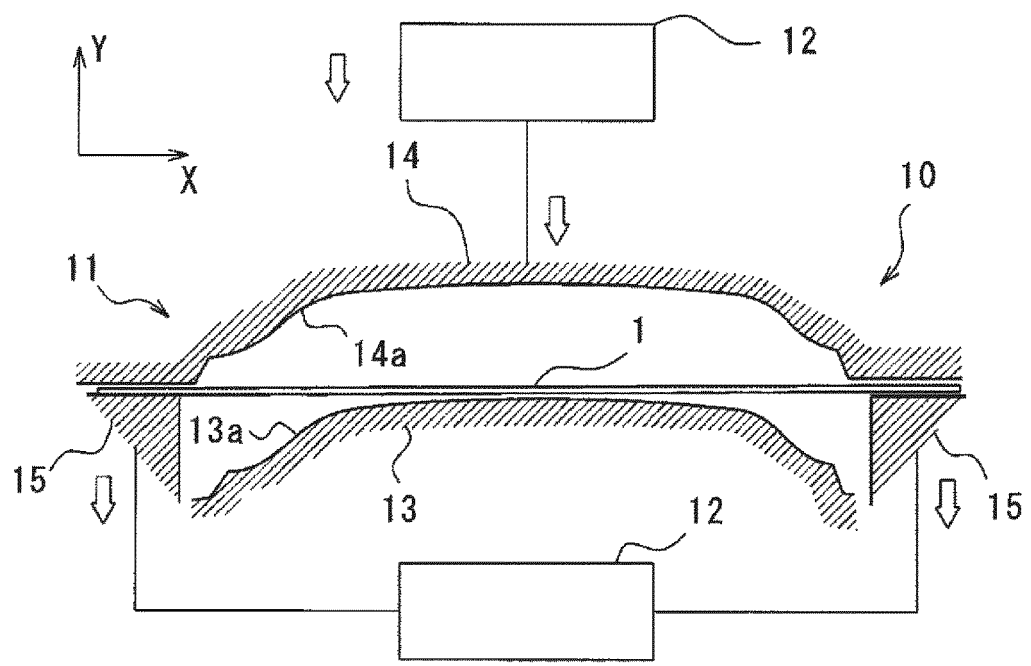
FIG. 1 is a cross-sectional view showing a state before forming in a first step of a method for manufacturing a press-formed product according to an embodiment of the present disclosure.

When a product including a sharp ridge line portion is press-formed, a blank material may be deviated in a direction orthogonal to the ridge line portion during forming, and an appearance defect called line misalignment may occur in a portion in contact with the ridge line portion at an initial stage of the forming. In order to prevent the line misalignment, adjustment of material inflow, die division, step division, and the like are performed. In particular, in a case where press forming is performed in two steps, such as a case where an intermediate shape is press-formed in a first step and a target shape is formed in a second step, deviation of the blank material is prevented and line misalignment is suppressed by increasing a radius of curvature of the ridge line portion and reducing a difference in cross-sectional line length between the intermediate shape and the target shape, as in Patent Literatures 1 to 3. However, in a method for reducing a difference in line length, sufficient tension is not generated in the ridge line portion, and it is difficult to obtain a shape equivalent to a design shape, particularly a sharp character line.

It is desirable to provide a method for manufacturing a press-formed product, a press forming die, and a press-formed product, in which line misalignment is prevented and a character line is clearly formed.

Hereinafter, an embodiment of the present disclosure will be described with reference to the accompanying drawings.

With reference to FIGS. 1 to 4, in a method for manufacturing a press-formed product 1 according to the present embodiment, a blank material 1 is press-formed into the press-formed product 1 in two steps. Specifically, the blank material 1 is formed into the press-formed product 1 having an intermediate shape by using a press forming die 11 in a first step with reference to FIGS. 1 and 2, and the blank material 1 is formed into the press-formed product 1 having a target shape by using another press forming die 21 in a second step with reference to FIGS. 3 and 4. Here, the blank material 1 (FIG. 1), the press-formed product 1 having the intermediate shape (FIG. 2), and the press-formed product 1 having the target shape (FIG. 5) are denoted by the same reference numeral in order to represent before, during, and after deformation of the same member. In each drawing, a Y direction indicates a pressing direction (height direction), and an X direction indicates a direction (horizontal direction) orthogonal to the Y direction. For clarity of illustration, hatching on the blank material 1 is omitted in FIGS. 1 to 4. This also applies to the subsequent drawings.

Figure 2:
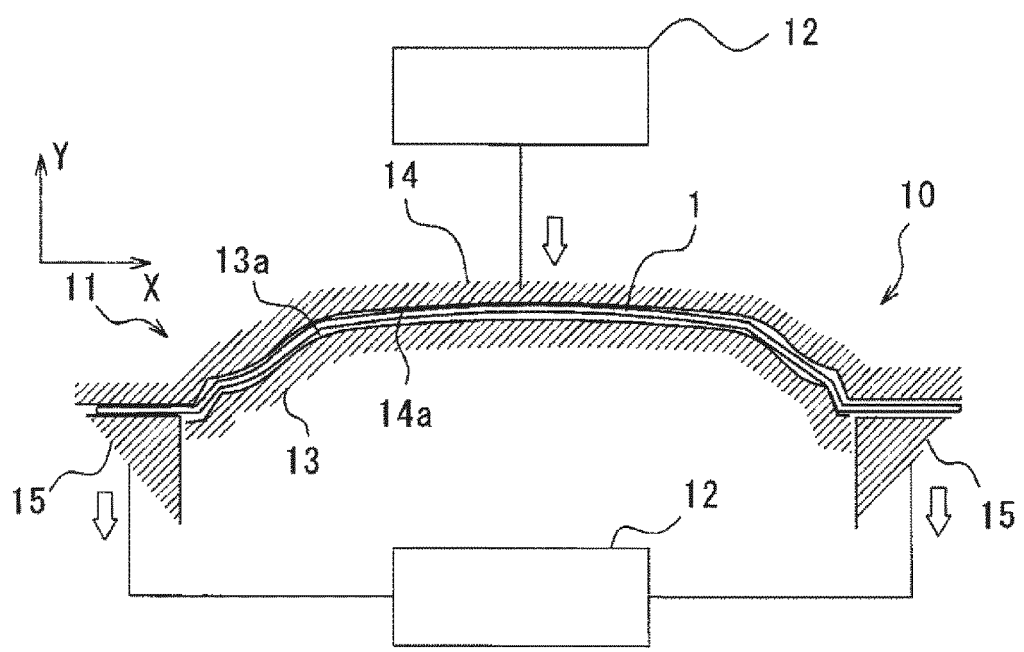
FIG. 2 is a cross-sectional view showing a state after forming in the first step of the method for manufacturing the press-formed product according to the embodiment of the present disclosure.

A press forming device 10 in the first step includes the press forming die 11 and a driving device 12 (schematically shown) with reference to FIGS. 1 and 2. The press forming die 11 is used for press forming of the intermediate shape, and includes a punch 13, a die 14, and a blank holder 15. The press forming die 11 (the punch 13 and the die 14) includes a pair of forming surfaces 13a, 14a corresponding to the intermediate shape to be described in detail later. The die 14 and the blank holder 15 are mechanically coupled to the driving device 12. The punch 13 is fixed, and the die 14 and the blank holder 15 are moved in the Y direction with respect to the punch 13 by the driving device 12.

Figure 3:
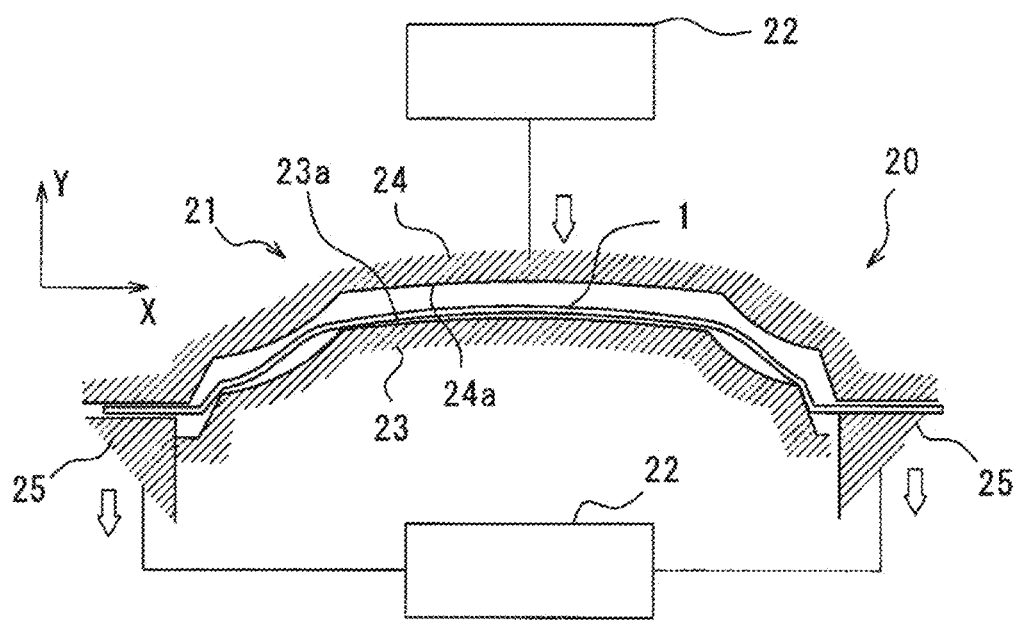
FIG. 3 is a cross-sectional view showing a state before forming in a second step of the method for manufacturing the press-formed product according to the embodiment of the present disclosure.
Figure 4:
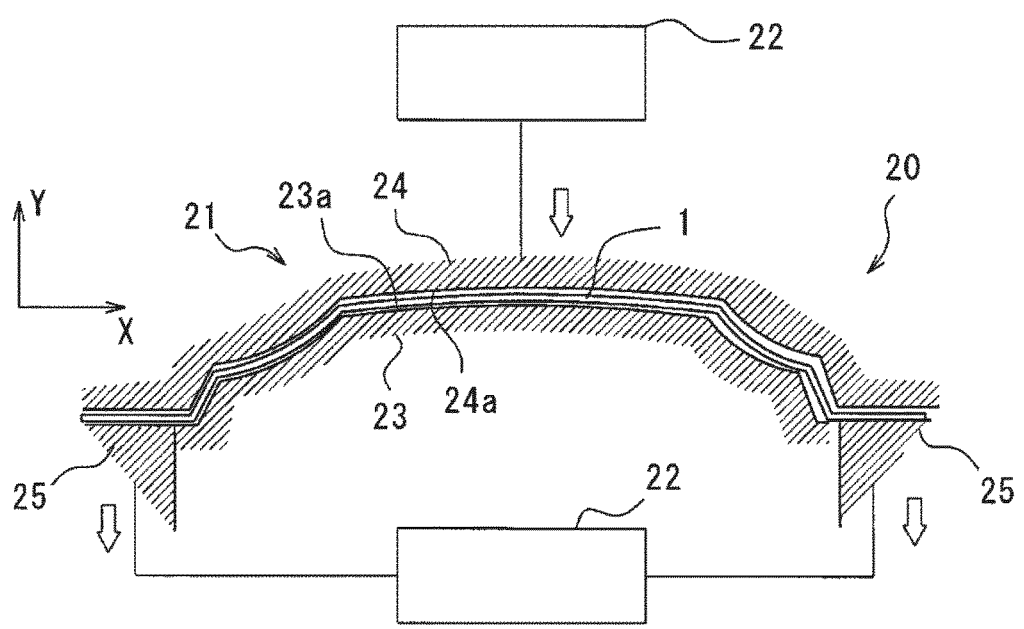
FIG. 4 is a cross-sectional view showing a state after forming in the second step of the method for manufacturing the press-formed product according to the embodiment of the present disclosure.

A press forming device 20 in the second step also includes the press forming die 21 and a driving device 22 (schematically shown) with reference to FIGS. 3 and 4. The press forming die 21 is used for press forming of the target shape, and includes a punch 23, a die 24, and a blank holder 25. The press forming die 21 (the punch 23 and the die 24) includes a pair of forming surfaces 23a, 24a corresponding to the target shape to be described in detail later. The die 24 and the blank holder 25 are mechanically coupled to the driving device 22. The punch 23 is fixed, and the die 24 and the blank holder 25 are moved in the Y direction with respect to the punch 23 by the driving device 22.

Figure 5:
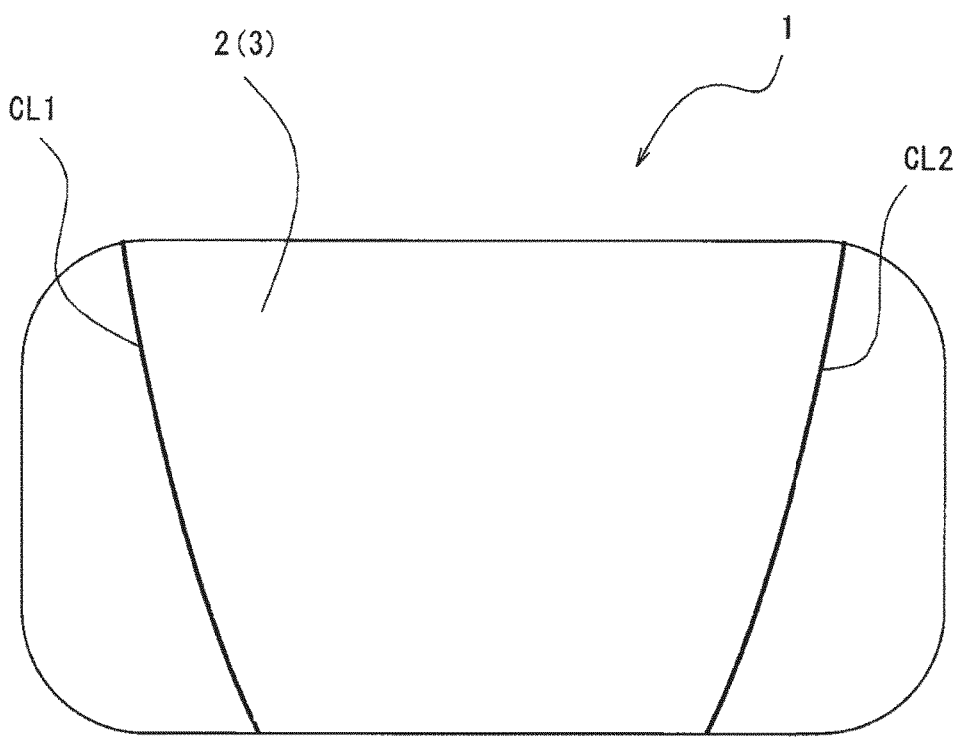
FIG. 5 is a plan view of a hood panel as the press-formed product.

A hood panel 1 of an automobile can be cited as an example of the press-formed product 1 manufactured in the present embodiment with reference to FIG. 5. The hood panel 1 is an outer panel disposed in a hood portion of the automobile, and is a member that greatly contributes to design of a front portion of the automobile. Therefore, character lines CL1, CL2 formed on the hood panel 1 are intended to have a clear aesthetic appearance. According to the method of the present embodiment, the character lines CL1, CL2 can be clearly formed while satisfying such a requirement.

Figure 6:
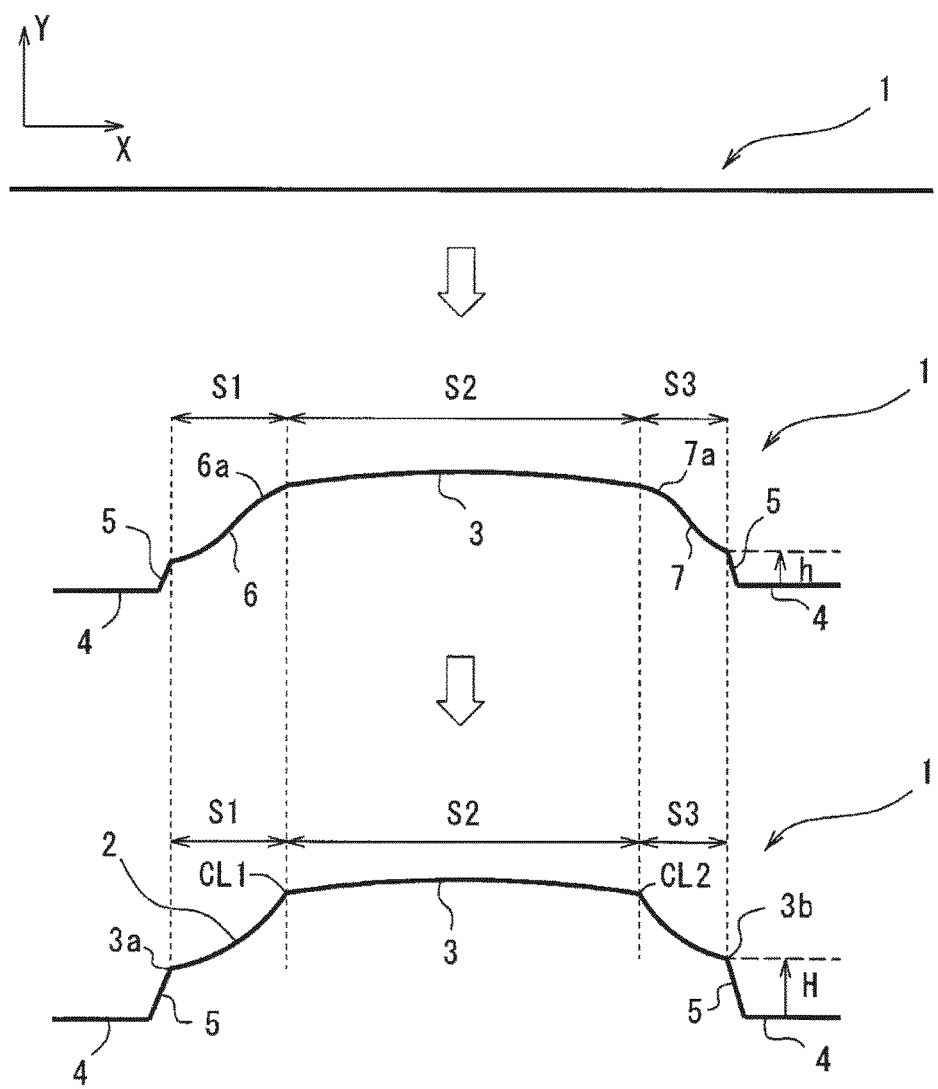
FIG. 6 is a cross-sectional view showing a deformation process of a blank material.
Figure 7:
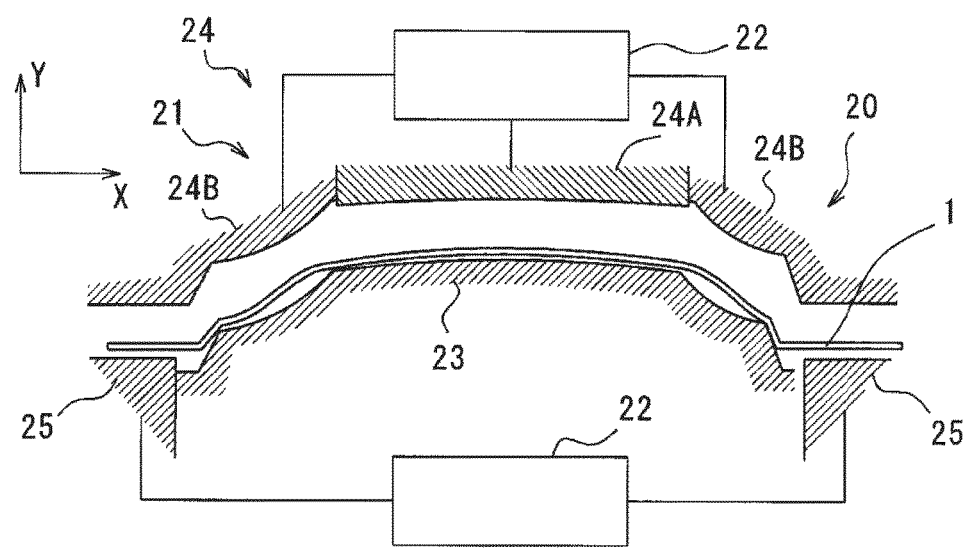
FIG. 7 is a cross-sectional view showing a state before forming in a second step of a method for manufacturing a press-formed product according to a modification.

FIG. 6 shows the flat plate-shaped blank material 1 before press forming, the press-formed product 1 having the intermediate shape, and the press-formed product 1 having the target shape, which are arranged in this order from the top.

The blank material 1 is, for example, a steel plate or an aluminum alloy plate. A thickness of the blank material 1 is, for example, 0.5 mm or larger and 1.2 mm or smaller.

The blank material (press-formed product) 1 includes a product portion 3 constituting a design surface 2, a peripheral portion 4 pressed by the blank holders 15, 25 (see FIGS. 1 to 4), and an excess thickness portion 5 connecting the product portion 3 and the peripheral portion 4. When the hood panel 1 (see FIG. 5) is finally formed as a product, portions other than the product portion 3 are cut off. The design surface 2 is a surface constituting an appearance of the hood panel 1, and is a hood surface visually recognized as a product appearance.

The product portion 3 of the target shape includes, on the design surface, a first ridge line portion CL1 and a second ridge line portion CL2 that each have a radius of curvature of 20 mm or smaller and a bending angle of 130 degrees or larger and do not intersect with each other. The first ridge line portion CL1 and the second ridge line portion CL2 constitute the character lines CL1, CL2 (see FIG. 5) in the hood panel 1. The first ridge line portion CL1 and the second ridge line portion CL2 constituting the character lines CL1, CL2 both have the radius of curvature of 20 mm or smaller and the bending angle of 130 degrees or larger. In the present embodiment, the first ridge line portion CL1 and second ridge line portion CL2 do not intersect with each other on the design surface 2.

The product portion 3 of the target shape includes a first region S1 from one end 3a of the product portion 3 to the first ridge line portion CL1, a second region S2 from the first ridge line portion CL1 to the second ridge line portion CL2, and a third region S3 from the second ridge line portion CL2 to the other end 3b of the product portion 3 in a specific cross section shown in FIG. 6 perpendicular to a direction in which the first ridge line portion CL1 (or the second ridge line portion CL2) extends. Specifically, the first region S1 does not include the first ridge line portion CL1 and refers to a region outside an outer end of a curved shape of the first ridge line portion CL1. Similarly, the second region S2 does not include either the first ridge line portion CL1 or the second ridge line portion CL2, and refers to a region from an inner end of the curved shape of the first ridge line portion CL1 to an inner end of the second ridge line portion CL2. Similarly, the third region S3 does not include the second ridge line portion CL2 and refers to a region outside an outer end of a curved shape of the second ridge line portion CL2.

The product portion 3 of the intermediate shape has a shape the same as the target shape in a central region S2 corresponding to the second region S2 of the target shape. Here, the central region S2 indicates a region the same as the second region S2 in the X direction. That is, in FIG. 6, since the second region S2 and the central region S2 indicate substantially the same region as indicated by connecting broken lines, the second region S2 and the central region S2 are denoted by the same reference numeral (S2). Similarly, one end side region S1 and the other end side region S3 of the intermediate shape correspond to the first region S1 and the third region S3 of the target shape, respectively, and are denoted by the same reference numerals (S1, S3).

The product portion 3 of the intermediate shape has shoulder portions 6, 7 extending from the central region S2 to the excess thickness portions 5 on both sides in the specific cross section. In the present embodiment, the shoulder portion 6 is provided in the one end side region S1, and includes a curved portion 6a having a curved shape with a radius of curvature of 100 mm or larger. Similarly, the shoulder portion 7 is provided in the other end side region S3, and includes a curved portion 7a having a curved shape with a radius of curvature of 100 mm or larger. Alternatively, the shoulder portions 6, 7 may have linear portions each having a linear shape instead of the curved portions 6a, 7a.

A height h [mm] of the excess thickness portion 5 of the intermediate shape is higher than 10 [mm] with respect to the peripheral portion 4 and lower than a height H [mm] of the excess thickness portion 5 of the target shape (10<h<H) with reference to FIG. 6. The peripheral portion 4 is pressed by the blank holders 15, 25 (see FIGS. 1 to 4), and is configured as a horizontal plane (a line extending in the X direction in the drawing) in both the intermediate shape and the target shape.

In the first region (one end side region) S1 in the specific cross section, a cross-sectional line length Lg1 of the target shape is equal to or longer than a cross-sectional line length Lm1 of the intermediate shape (Lm1≤Lg1). Similarly, in the third region (the other end side region) S3 in the specific cross section, a cross-sectional line length Lg3 of the target shape is equal to or longer than a cross-sectional line length Lm3 of the intermediate shape (Lm3≤Lg3). That is, in the first region (one end side region) S1 and the third region (the other end side region) S3, the blank material 1 is extended when being formed from the intermediate shape into the target shape.

An operation of each step of the method for manufacturing the press-formed product 1 according to the present embodiment will be described.

In the first step, the blank material 1 is fixed by sandwiching the peripheral portion 4 of the blank material 1 with the blank holder 15 and the die 14 with reference to FIG. 1. Next, the die 14 and the blank holder 15 are driven by the driving device 12, and the product portion 3 and the excess thickness portion 5 of the blank material 1 are press-formed into the intermediate shape by the punch 13 and the die 14 with reference to FIG. 2.

In the second step, the blank material 1 is fixed by sandwiching the peripheral portion 4 of the blank material 1 with the blank holder 25 and the die 24 with reference to FIG. 3. Next, the die 24 and the blank holder 25 are driven by the driving device 22, and the product portion 3 and the excess thickness portion 5 of the blank material 1 are press-formed into the target shape by the punch 23 and the die 24 with reference to FIG. 4.

According to the present embodiment, since a height of the excess thickness portion 5 of the intermediate shape is designed to be higher than 10 mm with respect to the peripheral portion 4 and lower than a height of the excess thickness portion 5 of the target shape (10<h<H), the excess thickness portion 5 is stretched when the blank material 1 is formed from the intermediate shape to the target shape. Therefore, when the blank material 1 is formed from the intermediate shape to the target shape, a material inflow from the excess thickness portion 5 to the product portion 3 is prevented, and an excess thickness in the product portion 3 can be prevented. Thereby, it is possible to prevent occurrence of wrinkles, prevent line misalignment, and clearly form the character lines CL1, CL2. Since the press forming is divided into two steps, it is possible to form the press-formed product 1 having a sharp shape that is difficult to be formed by only one step. In particular, in the forming of the intermediate shape in the first step, a shape the same as the target shape has already been formed in the central region S2. Therefore, in the central region S2 (the second region S2), since deformation is not caused in the forming of the target shape in the second step, it is possible to prevent positional deviation during forming of the first ridge line portion CL1 and the second ridge line portion CL2. The first ridge line portion CL1 and the second ridge line portion CL2 constituting the character lines CL1, CL2 both have the radius of curvature of 20 mm or smaller and the bending angle of 130 degrees or larger, and do not intersect with each other on the design surface 2, and such character lines CL1, CL2 are easily employed in the hood panel 1 of the automobile and are intended to have sharpness. Therefore, the press forming in the two steps according to the present embodiment is also effective from a viewpoint of sharpening of the character lines CL1, CL2. The product portion 3 of the intermediate shape has curved portions 6a, 7a each having the radius of curvature of 100 mm or larger from the central region S2 toward the excess thickness portions 5 on both sides in the specific cross section. That is, since the intermediate shape has a gentle shape while avoiding a sharp shape, cracking in press forming can be prevented.

In the first region S1 and the third region S3 in the specific cross section, the cross-sectional line lengths Lg1, Lg3 of the target shape are equal to or longer than the cross-sectional line lengths Lm1, Lm3 of the intermediate shape (Lm1≤Lg1 and Lm3≤Lg3), respectively, so that an excess thickness in the target shape can be further prevented. If the cross-sectional line lengths Lm1, Lm3 of the intermediate shape are longer than the cross-sectional line lengths Lg1, Lg3 of the target shape (Lg1<Lm1, Lg3<Lm3) in the first region S1 and the third region S3, an excess thickness is generated in the target shape by a difference of the cross-sectional line lengths when the intermediate shape is formed into the target shape. Therefore, in order to prevent this, the cross-sectional line lengths Lg1, Lg3 of the target shape are set to be longer than the cross-sectional line lengths Lm1, Lm3 of the intermediate shape. In the second region (central region) S2, since the intermediate shape and the target shape have the same shape, cross-sectional line lengths are equal to each other.

A modification of the second step will be described with reference to FIGS. 7 to 10.

In the present modification, the press forming device 20 includes a die 24A that is separated so as to be able to press only the second region (central region) S2. The separated die 24A is mechanically coupled to the driving device 22 so as to be movable independently of the other dies 24B.

Figure 8:
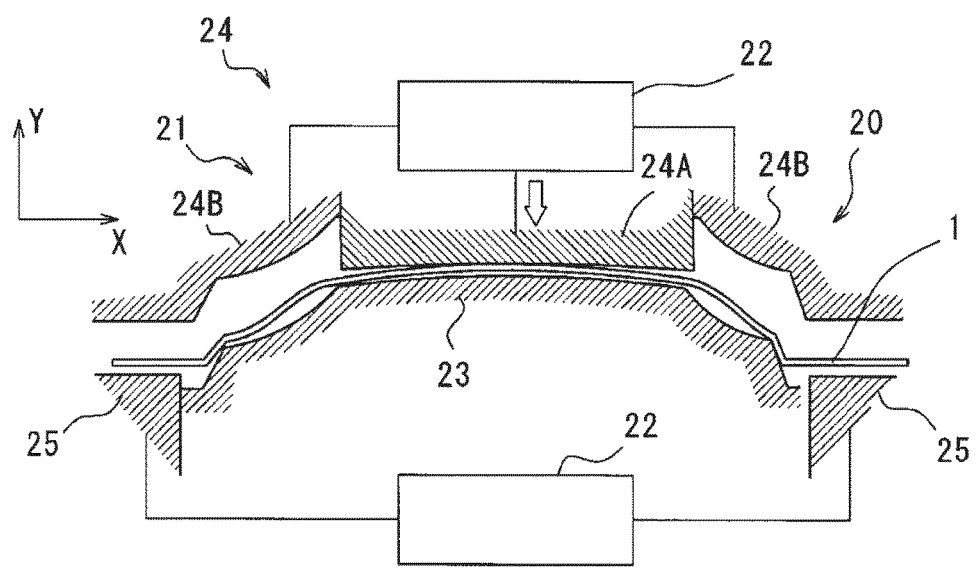
FIG. 8 is a cross-sectional view showing a state during forming in the second step of the method for manufacturing the press-formed product according to the modification.
Figure 9:
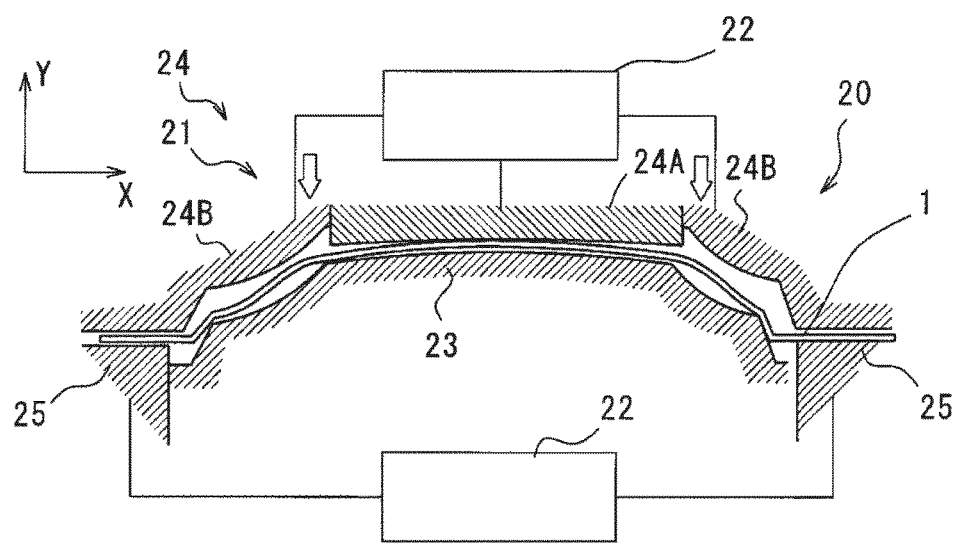
FIG. 9 is a cross-sectional view showing a state during forming in the second step of the method for manufacturing the press-formed product according to the modification.
Figure 10:
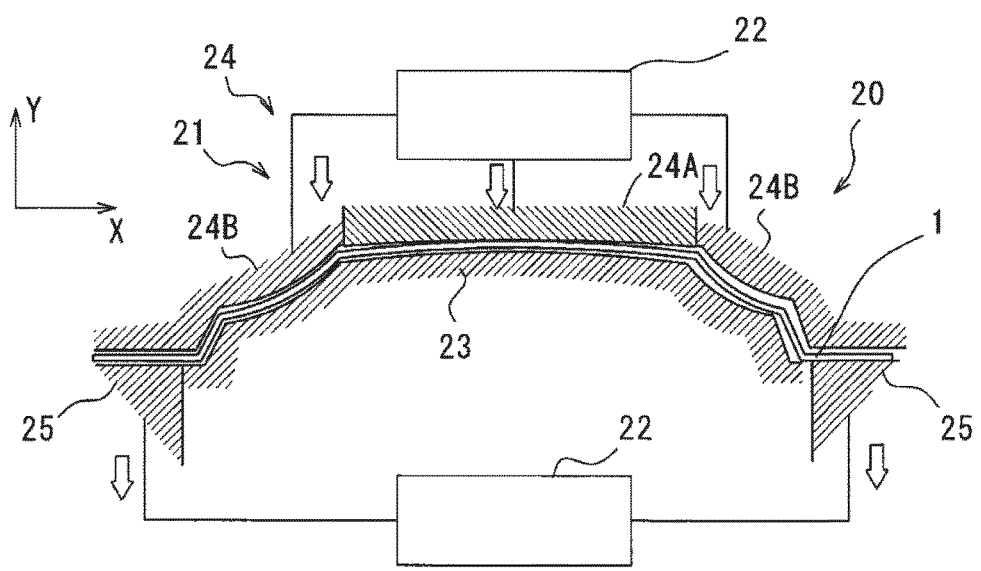
FIG. 10 is a cross-sectional view showing a state after forming in the second step of the method for manufacturing the press-formed product according to the modification.

In the present modification, particularly as shown in FIG. 8, in press forming of a target shape, before a position of the blank material 1 is fixed, that is, before the blank material 1 is pressed by the blank holder 25, only the second region (central region) S2 is pressed by the separated die 24A. Thereafter, as shown in FIG. 9, the blank material 1 is fixed by sandwiching the peripheral portion 4 of the blank material 1 with the blank holder 25 and the die 24. Finally, as shown in FIG. 10, the product portion 3 and the excess thickness portion 5 of the blank material 1 are press-formed into the target shape by the punch 23 and the die 24.

The entire second region S2 may be pressed by the separated die 24A as in the present modification, or only a part of the second region S2 may be pressed by the separated die.

According to the present modification, since only the second region (central region) S2 can be pressed first by the separated die 24A, the target shape can be press-formed without deviating the blank material 1 in the second region (central region) S2.

A result of checking effectiveness of the present modification by analysis will be described with reference to FIGS. 11 and 12.

Figure 11:
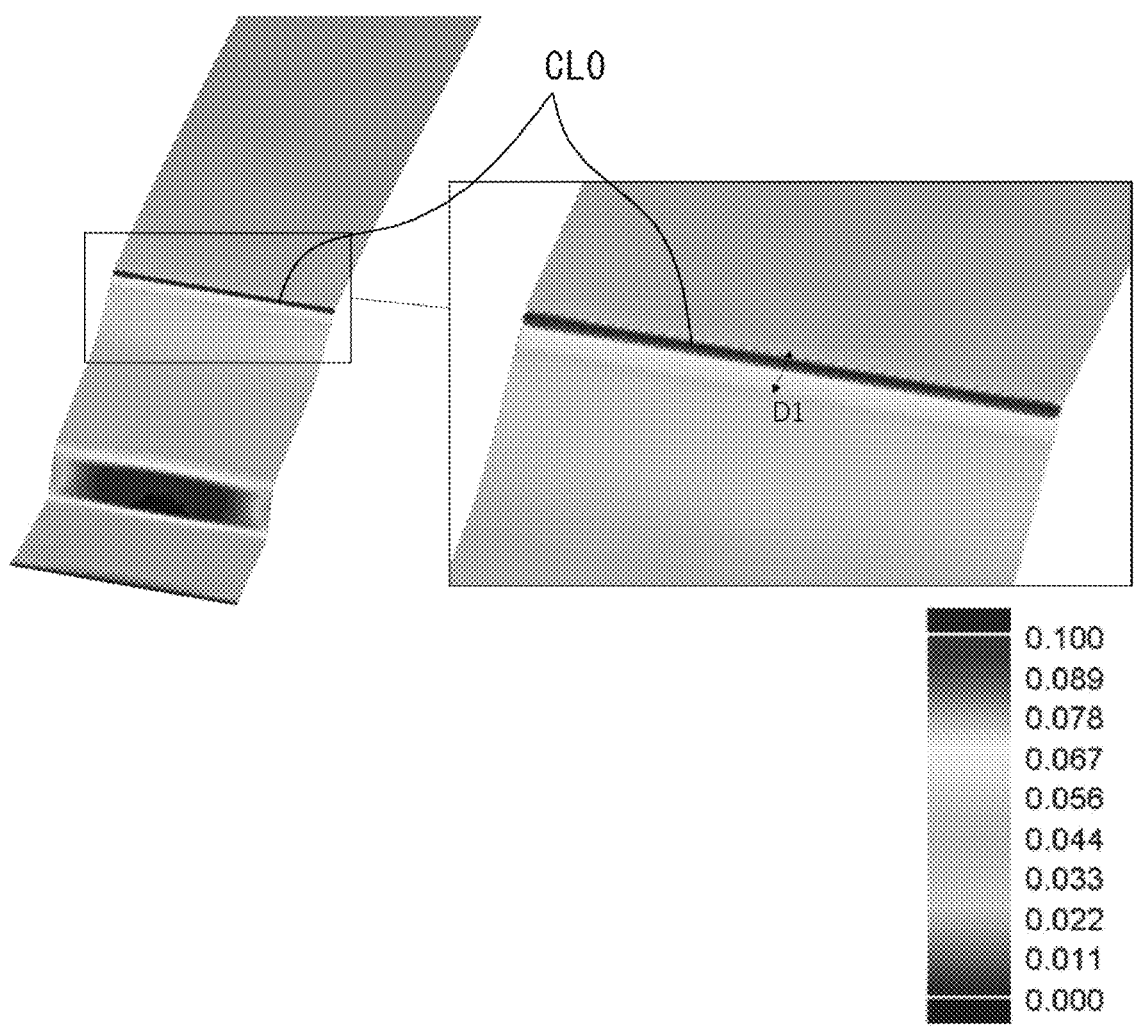
FIG. 11 is a contour diagram showing an analysis result of a method for manufacturing a press-formed product according to a comparative example.
Figure 12:
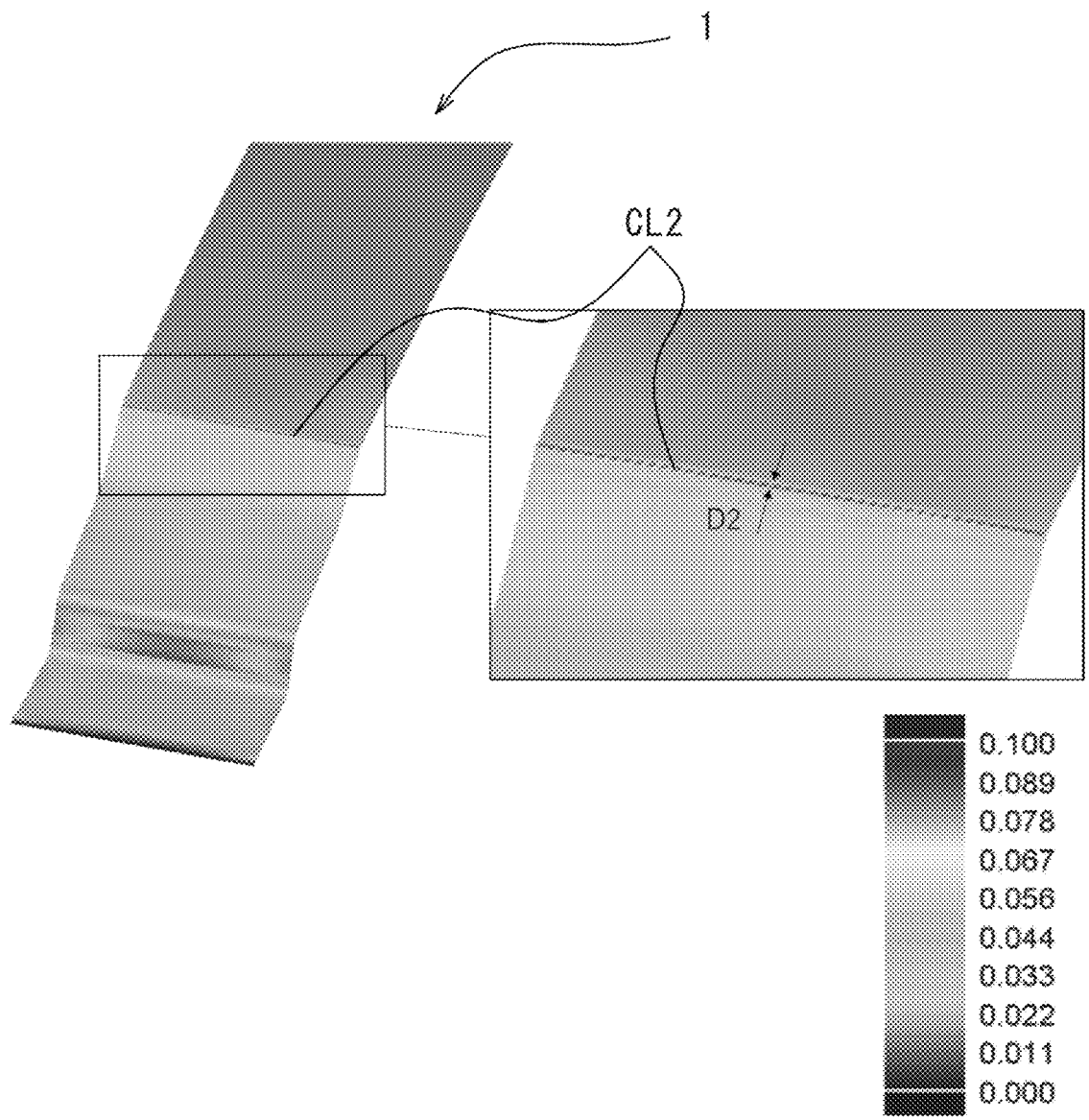
FIG. 12 is a contour diagram showing an analysis result of the method for manufacturing the press-formed product according to the modification.

In the analysis of FIGS. 11 and 12, a reduction width of a plate thickness of the blank material is shown by contour diagrams in press forming of a shape based on a partial cross section of the hood panel. In FIGS. 11 and 12, a portion surrounded by a rectangular frame is shown in an enlarged manner.

FIG. 11 is a contour diagram showing an analysis result of a method for manufacturing a press-formed product according to a comparative example. In the comparative example, an analysis simulating press forming in one general step is performed. FIG. 11 shows vicinity of a ridge line portion CL0 corresponding to the second ridge line portion CL2 and an enlarged view thereof.

FIG. 12 is a contour diagram showing an analysis result of a method for manufacturing a press-formed product according to the present modification. In the present modification, the press forming is divided into two steps, the intermediate shape and the target shape are defined as described above, and an analysis simulating the press forming in which only the second region S2 is pressed by the separated die 24A is performed. FIG. 12 shows vicinity of the second ridge line portion CL2 and an enlarged view thereof. In the comparative example and the present modification, analysis conditions such as physical property values are set to the same parameters.

When the analysis results of the comparative example and the present modification are compared, it can be seen that distribution of the reduction width of the plate thickness in the character line is wider in the comparative example than in the present modification (D2<D1). That is, in the comparative example, positional deviation of the blank material occurs, and sharpness of the character line is lost, as compared with the present modification. Therefore, in the present modification, line misalignment is prevented, and character line is clearly formed, as compared with the comparative example.

Although the specific embodiment of the present disclosure and the modification thereof have been described above, the present disclosure is not limited to the above embodiment, and various modifications can be made within the scope of the present disclosure.

Figure 13:
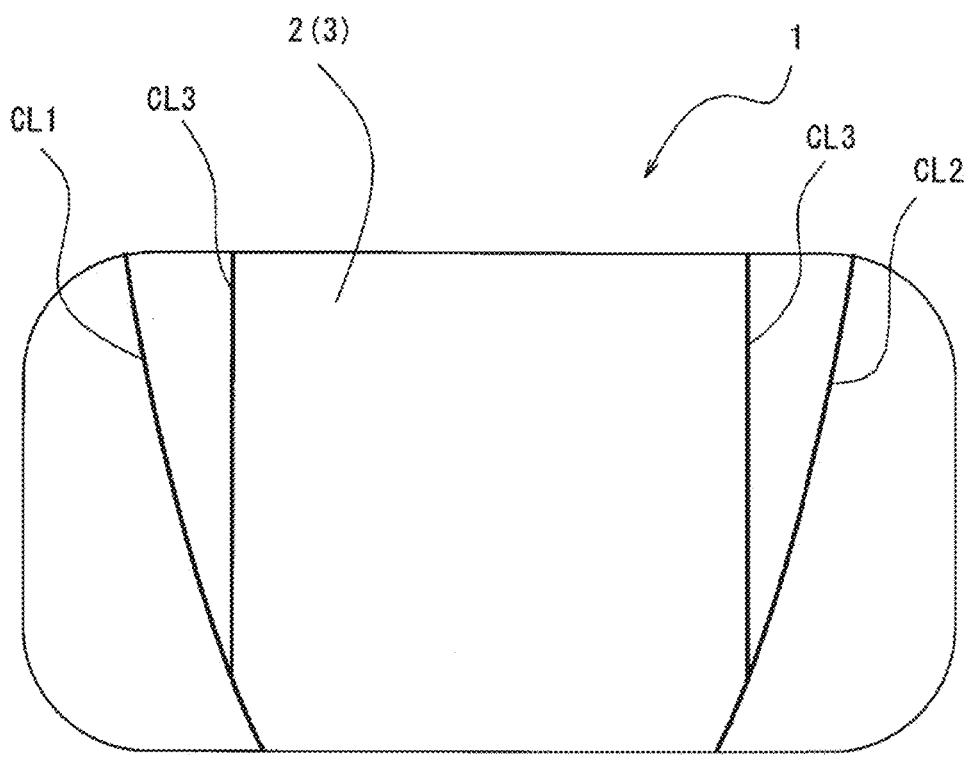
FIG. 13 is a plan view of a hood panel as a press-formed product according to a modification.
Figure 14:
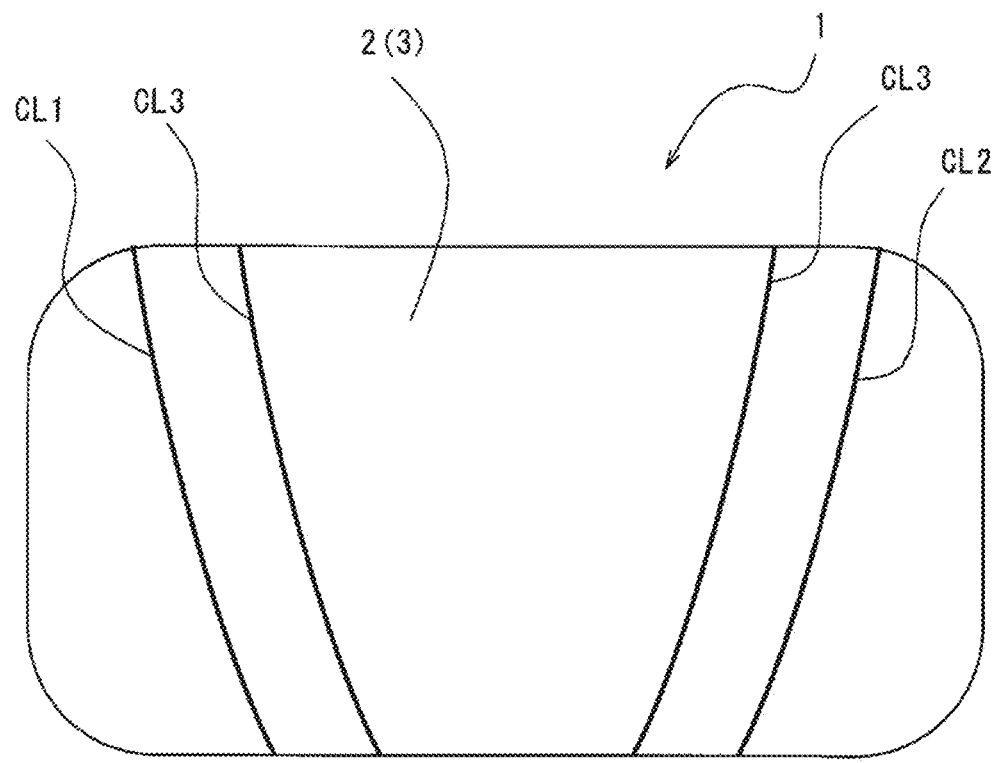
FIG. 14 is a plan view of a hood panel as a press-formed product according to a modification.

For example, the number of ridge line portions formed on the design surface 2 is not limited to two, and three or more ridge line portions may be formed. Specifically, a third ridge line portion (character line) CL3 different from the first ridge line portion CL1 and the second ridge line portion CL2 may be provided on a design surface the same as that of the first ridge line portion CL1 and the second ridge line portion CL2 (see FIGS. 13 and 14). In this case, the first ridge line portion CL1 and the second ridge line portion CL2 may be set as two lines adjacent to each other and farthest from each other. Thereby, even when there are three or more ridge line portions, at least two character lines (the first ridge line portion CL1 and the second ridge line portion CL2) can be clearly formed. For example, the third ridge line portion CL3 may extend in a direction intersecting the first ridge line portion CL1 and the second ridge line portion CL2 on the design surface 2 (see FIG. 13). For example, the third ridge line portion CL3 may be formed substantially parallel to the first ridge line portion CL1 and the second ridge line portion CL2 on the design surface 2, and may extend in a direction not intersecting the first ridge line portion CL1 and the second ridge line portion CL2 (see FIG. 14). A bending angle of the third ridge line portion CL3 may be 130 degrees or larger. A radius of curvature of the third ridge line portion CL3 may be 20 mm or smaller, and may be 20 mm or larger when the first ridge line portion CL1 and the second ridge line portion CL2 are sharpened.

The hood panel 1 is exemplified as a press-formed product in the above embodiment and modification, but other than this, an outer panel of an automobile such as a door panel, a fender panel, or a side panel can be exemplified. Further, an object of the press-formed product is not limited to an outer panel of an automobile, and may be any panel member in which a character line is formed on a design surface.

According to the method for manufacturing a press-formed product, a press forming die, and a press-formed product of the embodiment, since the height of the excess thickness portion of the intermediate shape is designed to be higher than 10 mm with respect to the peripheral portion and lower than the height of the excess thickness portion of the target shape, the excess thickness portion is extended when the blank material is formed from the intermediate shape into the target shape. Therefore, compared to the method for reducing the difference in the cross-sectional line length, tension generated in the ridge line portion is increased. Thereby, the blank material closely fits the die, line misalignment is prevented, and character lines can be more clearly formed. Since press forming is divided into two steps, it is possible to form the press-formed product having a sharp shape that is difficult to be formed by only one step. In particular, in forming of the intermediate shape in the first step, the shape the same as the target shape is formed in the central region. Therefore, in the central region (second region), since deformation is not caused in the forming of the target shape in the second step, it is possible to prevent positional deviation during forming of the first ridge line portion and the second ridge line portion. The first ridge line portion and the second ridge line portion constituting the character lines both have the radius of curvature of 20 mm or smaller and the bending angle of 130 degrees or larger, and such character lines are easily employed in a general-purpose press-formed product such as an outer panel of an automobile and are intended to have sharpness. Therefore, in the above method, the press forming in two steps is also effective from a viewpoint of sharpening the character lines. The product portion of the intermediate shape has the curved shape having the radius of curvature of 100 mm or larger or the linear shape from the central region toward the excess thickness portions on both sides in the specific cross section. That is, since the intermediate shape has a gentle shape while avoiding a sharp shape, cracking in press forming can be prevented. The design surface is a surface constituting an appearance of the press-formed product.

According to the method for manufacturing a press-formed product, a press forming die, and a press-formed product of the embodiment, both the first ridge line portion and the second ridge line portion constituting the character line do not intersect with each other, and such character lines are easily employed in a general-purpose press-formed product such as an outer panel of an automobile, and are intended to have sharpness. Therefore, it is possible to effectively function sharpening of the character lines realized by the above method.

According to methods for manufacturing a press-formed product, a press forming die, and a press-formed product of the embodiment, it is possible to clearly design the character line in a material and a design dimension that are easily employed in a general-purpose press-formed product such as an outer panel of an automobile.

According to the method for manufacturing a press-formed product, a press forming die, and a press-formed product of the embodiment, even when there are three or more ridge line portions, at least two character lines (the first ridge line portion and the second ridge line portion) can be clearly formed.

According to the method for manufacturing a press-formed product, a press forming die, and a press-formed product of the embodiment, an excess thickness in the target shape can be prevented. If the cross-sectional line length of the intermediate shape is longer than the cross-sectional line length of the target shape in each of the first region and the third region, an excess thickness is generated in the target shape by a difference of the cross-sectional line lengths when the intermediate shape is formed into the target shape. Therefore, in order to prevent this, the cross-sectional line length of the target shape is set to be longer than the cross-sectional line length of the intermediate shape. In the second region, since the intermediate shape and the target shape have the same shape, cross-sectional line lengths are equal to each other.

According to the method for manufacturing a press-formed product, a press forming die, and a press-formed product of the embodiment, since only the second region can be pressed first by the separated die, the target shape can be press-formed without deviating the blank material in the second region.

What is claimed is:

1. A method for manufacturing a press-formed product for press-forming a blank material into a target shape, the blank material including: a product portion constituting a design surface of a product, a peripheral portion pressed by a blank holder, and an excess thickness portion connecting the product portion and the peripheral portion, the method comprising:
   press-forming the blank material into an intermediate shape; and
   further press-forming the blank material from the intermediate shape into the press-formed product having the target shape,
   wherein the product portion of the target shape comprises a first ridge line portion and a second ridge line portion on the design surface, the first ridge line portion and the second ridge line portion each having a radius of curvature of 20 mm or smaller and a bending angle of 130 degrees or larger,
   wherein the product portion of the target shape comprises a first region from one end of the product portion to the first ridge line portion, a second region from the first ridge line portion to the second ridge line portion, and a third region from the second ridge line portion to the other end of the product portion in a specific cross section perpendicular to a direction in which the first ridge line portion or the second ridge line portion extends,
   wherein the product portion of the intermediate shape has a shape the same as the target shape in a central region corresponding to the second region of the target shape,
   wherein the product portion of the intermediate shape has a curved shape having a radius of curvature of 100 mm or larger or a linear shape from the central region toward the excess thickness portions on both sides in the specific cross section, and
   wherein a height of the excess thickness portion of the intermediate shape is higher than 10 mm with respect to the peripheral portion and lower than a height of the excess thickness portion of the target shape.

2. The method for manufacturing the press-formed product according to claim 1,
   wherein the first ridge line portion and the second ridge line portion on the design surface do not intersect with each other.

3. The method for manufacturing the press-formed product according to claim 1,
   wherein the blank material is a steel plate or an aluminum alloy plate.

4. The method for manufacturing the press-formed product according to claim 1,
   wherein a thickness of the blank material is 0.5 mm or larger and 1.2 mm or smaller.

5. The method for manufacturing the press-formed product according to claim 1,
   wherein the product portion of the target shape comprises one or more other ridge line portions on the design surface in addition to the first ridge line portion and the second ridge line portion, and
   wherein the first ridge line portion and the second ridge line portion are set as two lines adjacent to each other and farthest from each other.

6. The method for manufacturing the press-formed product according to claim 1,
   wherein in each of the first region and the third region of the specific cross section, a cross-sectional line length of the target shape is equal to or longer than a cross-sectional line length of the intermediate shape.

7. The method for manufacturing the press-formed product according to claim 1,
   wherein a press forming device that performs press forming of the target shape comprises a die that is separated so as to be able to press the second region, and
   wherein in the press forming of the target shape, the second region is pressed by the separated die before the blank material is pressed by the blank holder.

* * * * *